(12) United States Patent
Masuda et al.

(10) Patent No.: US 12,207,028 B2
(45) Date of Patent: Jan. 21, 2025

(54) CONTROL DEVICE, PROJECTION SYSTEM, CONTROL METHOD, AND CONTROL PROGRAM

(71) Applicant: FUJIFILM Corporation, Tokyo (JP)

(72) Inventors: Tomonori Masuda, Saitama (JP); Kazuki Ishida, Saitama (JP); Akihiro Ishizuka, Saitama (JP); Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 591 days.

(21) Appl. No.: 17/569,560

(22) Filed: Jan. 6, 2022

(65) Prior Publication Data

US 2022/0132080 A1 Apr. 28, 2022

Related U.S. Application Data

(63) Continuation of application No. PCT/JP2020/021641, filed on Jun. 1, 2020.

(30) Foreign Application Priority Data

Jul. 26, 2019 (JP) .................. 2019-138118

(51) Int. Cl.
  *H04N 9/31* (2006.01)
  *G06V 20/50* (2022.01)
  *H04N 9/28* (2006.01)

(52) U.S. Cl.
  CPC ............ *H04N 9/317* (2013.01); *G06V 20/50* (2022.01); *H04N 9/28* (2013.01); *H04N 9/3179* (2013.01); *H04N 9/3194* (2013.01)

(58) Field of Classification Search
  CPC ........ H04N 9/317; H04N 9/28; H04N 9/3179; H04N 9/3194; G06V 20/50
  (Continued)

(56) References Cited

U.S. PATENT DOCUMENTS

| 2005/0179875 A1 | 8/2005 | Aoyanagi |
| 2009/0115721 A1* | 5/2009 | Aull ............... G06F 3/0425 348/E5.029 |
| 2016/0054859 A1 | 2/2016 | Oshima |

FOREIGN PATENT DOCUMENTS

| JP | 8-29163 A | 2/1996 |
| JP | 2005-229415 A | 8/2005 |

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/021641, dated Feb. 10, 2022, with an English translation.

(Continued)

*Primary Examiner* — Mark Roz
(74) *Attorney, Agent, or Firm* — Birch, Stewart, Kolasch & Birch, LLP

(57) ABSTRACT

A control device of a projection system including an optical system that projects an image generated in a display portion based on input image data to a projection object, and an imaging portion that images the projection object, includes: a distance determination portion that acquires first captured image data of the image projected to the projection object from the imaging portion and determines a distance from an object present between the projection object and the optical system to the optical system based on a first sharpness of a part or an entire part of the first captured image data and a second sharpness of the input image data.

32 Claims, 15 Drawing Sheets

(58) Field of Classification Search
USPC .......................................................... 382/106
See application file for complete search history.

(56) References Cited

FOREIGN PATENT DOCUMENTS

| | | |
|---|---|---|
| JP | 2007-156325 A | 6/2007 |
| JP | 2010-230864 A | 10/2010 |
| JP | 2014-138411 A | 7/2014 |
| JP | 2016-139396 A | 8/2016 |
| JP | 2018-25809 A | 2/2018 |
| JP | 2019-7826 A | 1/2019 |
| KR | 10-2019-0074585 A | 6/2019 |

OTHER PUBLICATIONS

International Search Report (Form PCT/ISA/210) for International Application No. PCT/JP2020/021641, dated Aug. 11, 2020, with an English translation.
Japanese Notice of Reasons for Refusal for corresponding Japanese Application No. 2021-536633, dated Apr. 19, 2022, with an English translation.

* cited by examiner

FIG. 7
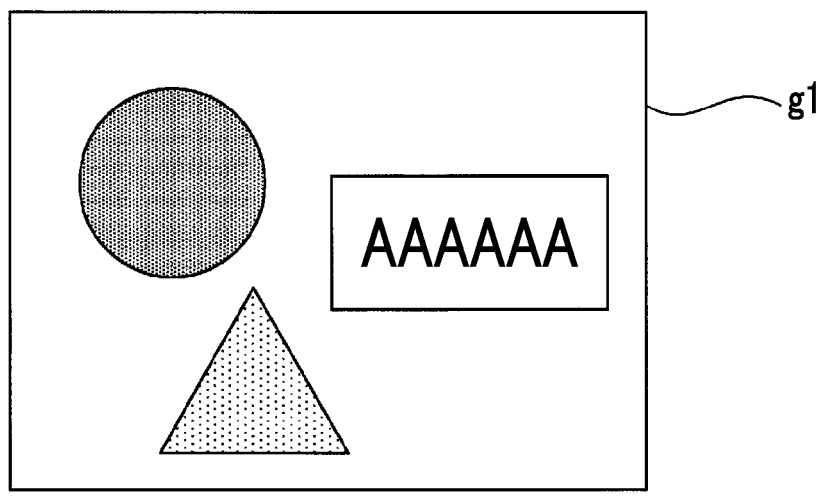
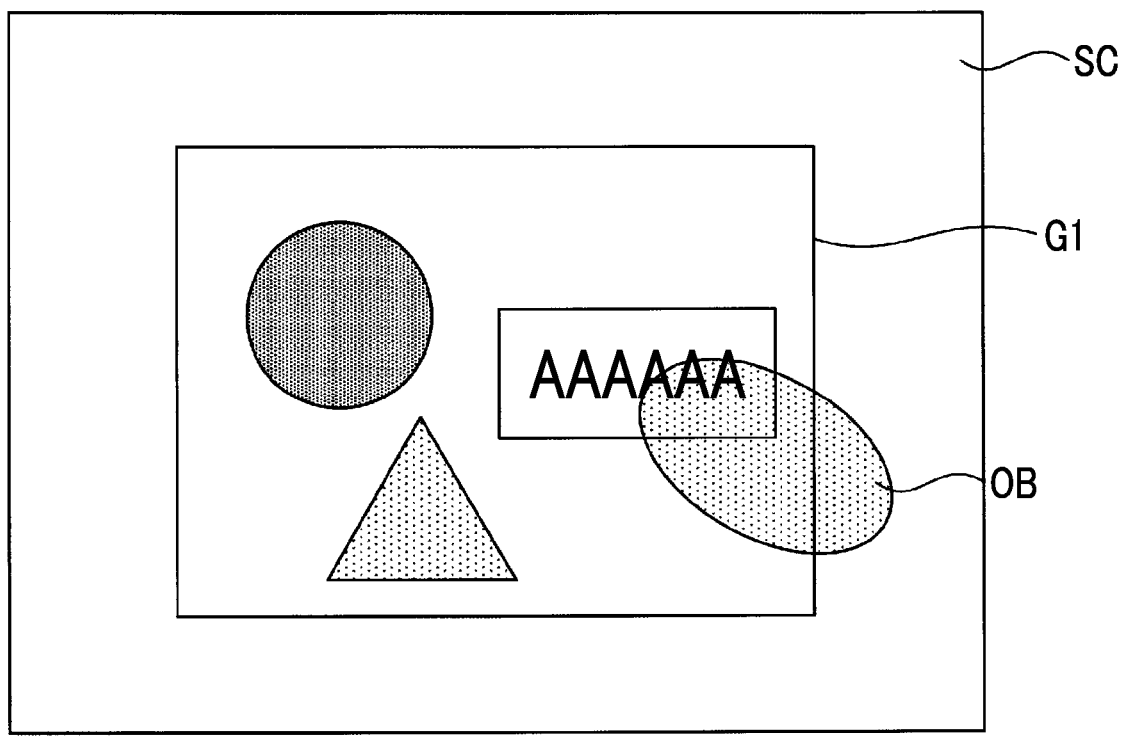

FIG. 11
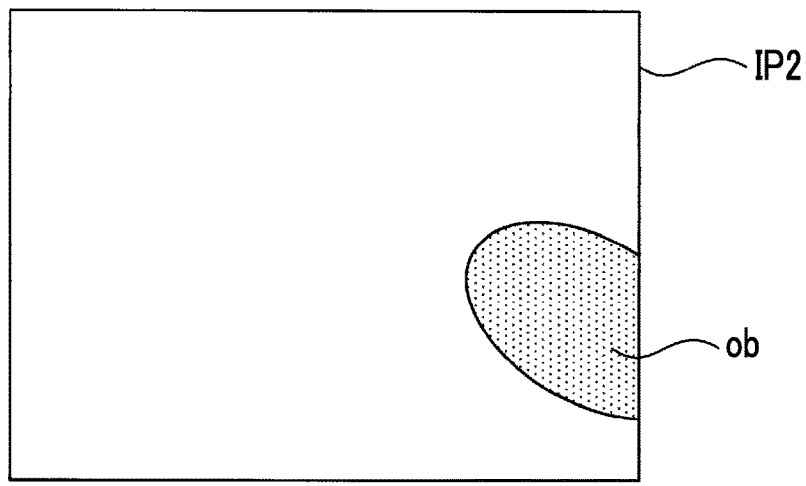
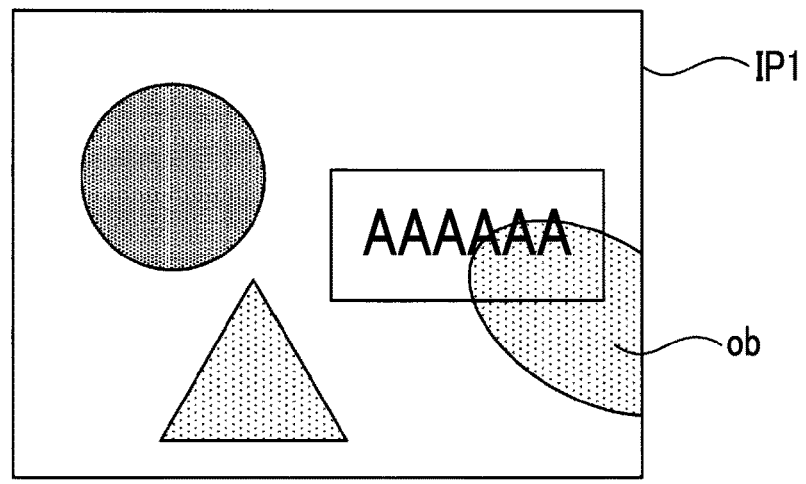
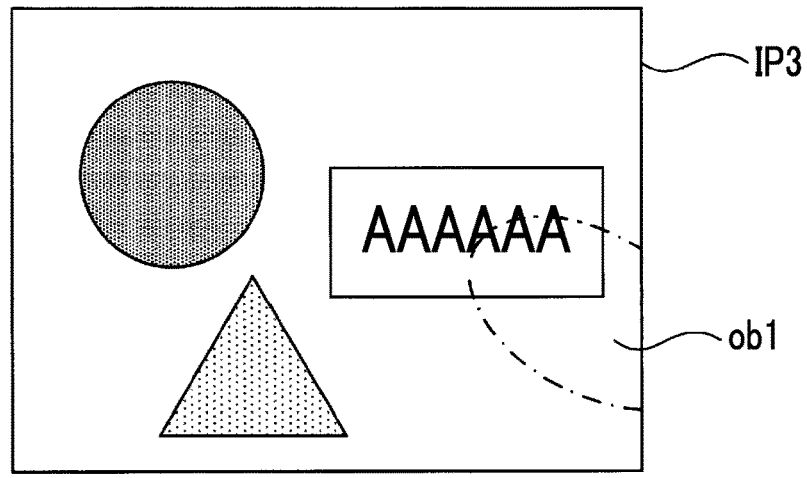

CONTROL DEVICE, PROJECTION SYSTEM, CONTROL METHOD, AND CONTROL PROGRAM

CROSS REFERENCE TO RELATED APPLICATION

This is a continuation of International Application No. PCT/JP2020/021641 filed on Jun. 1, 2020, and claims priority from Japanese Patent Application No. 2019-138118 filed on Jul. 26, 2019, the entire disclosures of which are incorporated herein by reference.

BACKGROUND OF THE INVENTION

1. Field of the Invention

The present invention relates to a control device, a projection system, a control method, and a computer readable medium storing a control program.

2. Description of the Related Art

A system in which an imaging apparatus and a projection apparatus are combined has been suggested (for example, refer to JP2005-229415A and JP2016-139396A). JP2005-229415A discloses measurement of a distance to an obstacle between a projection surface and an apparatus using a plurality of cameras. JP2016-139396A discloses detection of a touch position of a finger on a projection surface using an infrared ray or the like.

SUMMARY OF THE INVENTION

An embodiment according to the disclosed technology provides a control device, a projection system, a control method, and a computer readable medium storing a control program that can determine a distance to an object between a projection object and an optical system projecting an image to the projection object at a low cost.

A control device according to an aspect of the present invention is a control device of a projection system including an optical system that projects an image generated in a display portion based on input image data to a projection object, and an imaging portion that images the projection object, and comprises a distance determination portion that acquires first captured image data of the image projected to the projection object from the imaging portion and determines a distance from an object present between the projection object and the optical system to the optical system based on a first sharpness of a part of or the entire first captured image data and a second sharpness of the input image data.

A projection system according to an aspect of the present invention comprises the control device, the optical system, and the imaging portion.

A control method according to an aspect of the present invention is a control method of a projection system including an optical system that projects an image generated in a display portion based on input image data to a projection object, and an imaging portion that images the projection object, and comprises a distance determination step of acquiring first captured image data of the image projected to the projection object from the imaging portion and determining a distance from an object present between the projection object and the optical system to the optical system based on a first sharpness of a part of or the entire first captured image data and a second sharpness of the input image data.

A control program according to an aspect of the present invention is a control program of a projection system including an optical system that projects an image generated in a display portion based on input image data to a projection object, and an imaging portion that images the projection object, and causes a computer to execute a distance determination step of acquiring first captured image data of the image projected to the projection object from the imaging portion and determining a distance from an object present between the projection object and the optical system to the optical system based on a first sharpness of a part of or the entire first captured image data and a second sharpness of the input image data.

According to the present invention, a control device, a projection system, a control method, and a control program that can determine a distance to an object between a projection object and an optical system projecting an image to the projection object at a low cost can be provided.

BRIEF DESCRIPTION OF THE DRAWINGS

FIG. 7 is a schematic diagram illustrating an example of input image data g1 and an image G1 based on the input image data g1.

FIG. 11 is a diagram illustrating an example of second captured image data IP2 acquired in step S22, first captured image data IP1 acquired in step S3, and third captured image data IP3 generated in step S23.

DESCRIPTION OF THE PREFERRED EMBODIMENTS

Hereinafter, an embodiment of the present invention will be described with reference to the drawings.

Figure 1:
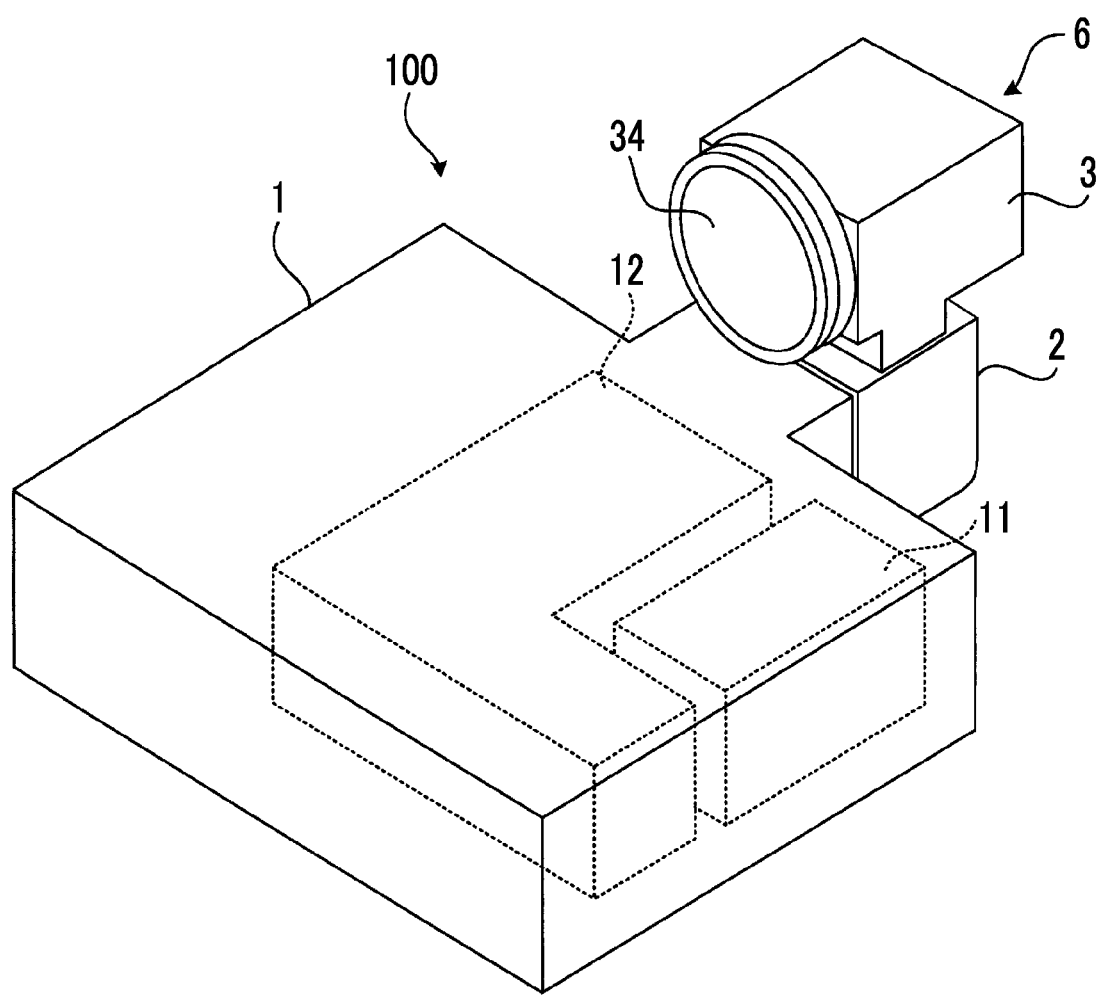
FIG. 1 is a schematic diagram illustrating an exterior configuration of a projector 100 that is an embodiment of a projection system according to the embodiment of the present invention.
Figure 2:
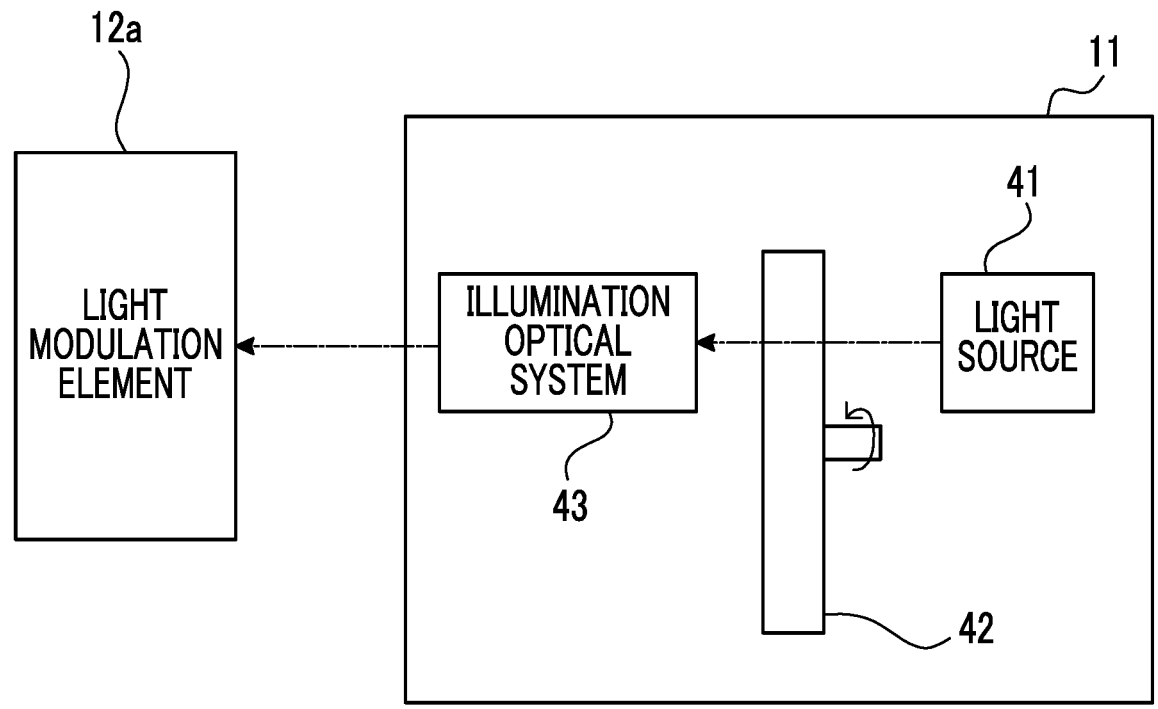
FIG. 2 is a schematic diagram illustrating an example of an internal configuration of a light source unit 11 in FIG. 1.
Figure 3:
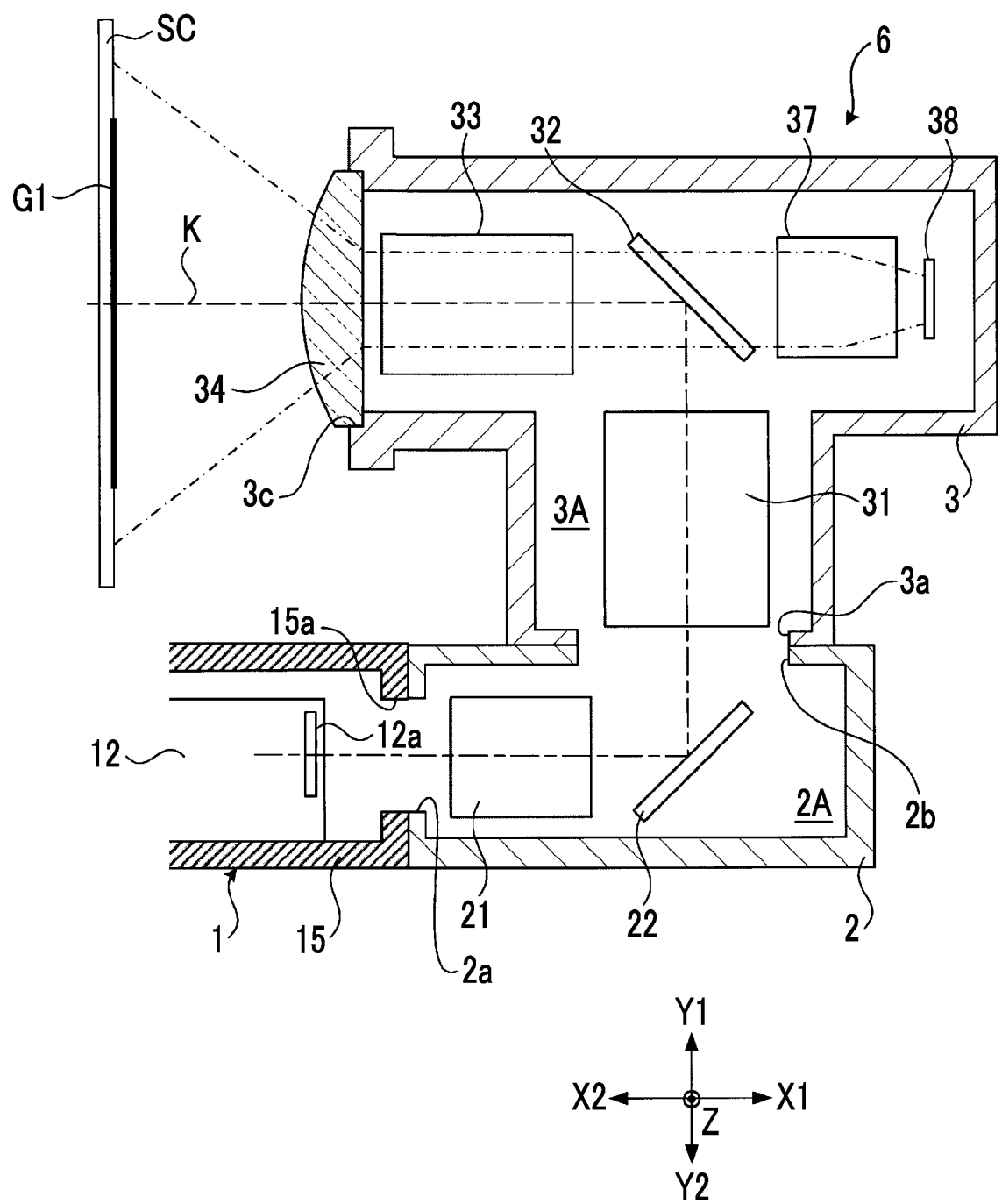
FIG. 3 is a schematic cross-sectional view of an optical unit 6 of the projector 100 illustrated in FIG. 1.

FIG. 1 is a schematic diagram illustrating an exterior configuration of a projector 100 that is an embodiment of a projection system according to the embodiment of the present invention. FIG. 2 is a schematic diagram illustrating an example of an internal configuration of a light source unit 11 in FIG. 1. FIG. 3 is a schematic cross-sectional view of an optical unit 6 of the projector 100 illustrated in FIG. 1. FIG. 3 illustrates a cross section in a plane along an optical path of light emitted from a body part 1.

As illustrated in FIG. 1, the projector 100 comprises the body part 1 and the optical unit 6 disposed to protrude from the body part 1. The optical unit 6 comprises a first member 2 supported by the body part 1 and a second member 3 supported by the first member 2. The second member 3 may be fixed to the first member 2 in a rotatable state. In addition, the first member 2 and the second member 3 may be integrated members. The optical unit 6 may be attachably and detachably configured (in other words, interchangeably configured) with respect to the body part 1.

The body part 1 includes a housing 15 in which an opening 15a for causing light to pass to a part connected to the optical unit 6 is formed (refer to FIG. 3).

As illustrated in FIG. 1, the light source unit 11 and a light modulation unit 12 including a light modulation element 12a (refer to FIG. 2) that generates an image by spatially modulating light emitted from the light source unit 11 based on input image data are disposed inside the housing 15 of the body part 1. A display portion is configured with the light source unit 11 and the light modulation unit 12.

In the example illustrated in FIG. 2, the light source unit 11 comprises a light source 41 emitting white light, a color wheel 42, and an illumination optical system 43. The light source 41 is configured to include a light emitting element such as a laser or a light emitting diode (LED). The color wheel 42 is arranged between the light source 41 and the illumination optical system 43. The color wheel 42 is a member having a circular plate shape. An R filter that allows transmission of red light, a G filter that allows transmission of green light, and a B filter that allows transmission of blue light are disposed in a circumferential direction of the color wheel 42. The color wheel 42 is rotated about a shaft and guides the white light emitted from the light source 41 to the illumination optical system 43 by separating the white light into red light, green light, and blue light in a time-division manner. Light emitted from the illumination optical system 43 is incident on the light modulation element 12a.

In a case of the configuration of the light source unit 11 in FIG. 2, for example, a digital micromirror device (DMD) is used as the light modulation element 12a included in the light modulation unit 12. A liquid crystal on silicon (LCOS), a micro electro mechanical systems (MEMS) element, a liquid crystal display device, or the like can also be used as the light modulation element 12a. As illustrated in FIG. 3, an image G1 formed by the light spatially modulated by the light modulation unit 12 is incident on the optical unit 6 by passing through the opening 15a of the housing 15 and is projected to a screen SC as a projection object (refer to FIG. 3).

As illustrated in FIG. 3, the optical unit 6 comprises the first member 2 including a hollow portion 2A connected to the inside of the body part 1, the second member 3 including a hollow portion 3A connected to the hollow portion 2A, a first optical system 21 and a reflective member 22 arranged in the hollow portion 2A, and a second optical system 31, a branch member 32, a third optical system 33, a fourth optical system 37, an imaging element 38, and a lens 34 arranged in the hollow portion 3A.

The first member 2 is a member of which a cross-sectional exterior shape is, for example, a rectangular shape. An opening 2a and an opening 2b are formed in surfaces perpendicular to each other. The first member 2 is supported by the body part 1 in a state where the opening 2a is arranged at a position facing the opening 15a of the body part 1. Light emitted from the light modulation element 12a of the light modulation unit 12 of the body part 1 is incident into the hollow portion 2A of the first member 2 by passing through the opening 15a and the opening 2a.

An incidence direction of the light incident into the hollow portion 2A from the body part 1 will be referred to as a direction X1. A direction opposite to the direction X1 will be referred to as a direction X2. The direction X1 and the direction X2 will be collectively referred to as a direction X. In addition, a depth direction from the front of FIG. 3 and a direction opposite to the depth direction will be referred to as a direction Z. In addition, a direction perpendicular to the direction X and the direction Z will be referred to as a direction Y. In the direction Y, an upward direction in FIG. 3 will be referred to as a direction Y1, and a downward direction in FIG. 3 will be referred to as a direction Y2.

The first optical system 21, the reflective member 22, the second optical system 31, the branch member 32, the third optical system 33, and the lens 34 constitute an optical system that projects the image formed by the light modulation element 12a (image generated in the display portion) to the screen SC. An optical axis K of this optical system is illustrated in FIG. 3. The first optical system 21, the reflective member 22, the second optical system 31, the branch member 32, the third optical system 33, and the lens 34 are arranged in this order from the light modulation element 12a side along the optical axis K.

The first optical system 21 includes at least one lens and guides, to the reflective member 22, light that is incident on the first member 2 from the body part 1 and travels in the direction X1.

The reflective member 22 reflects the light incident from the first optical system 21 in the direction Y1. The reflective member 22 is configured with, for example, a mirror. In the first member 2, the opening 2b is formed on an optical path of the light reflected by the reflective member 22. The reflected light travels to the hollow portion 3A of the second member 3 by passing through the opening 2b.

The second member 3 is a member of which a cross-sectional exterior shape is, for example, an approximately T shape. An opening 3a is formed at a position facing the opening 2b of the first member 2. The light that has passed through the opening 2b of the first member 2 from the body part 1 is incident into the hollow portion 3A of the second member 3 by passing through the opening 3a.

The second optical system 31 includes at least one lens and guides light incident from the first member 2 to the branch member 32.

The branch member 32 guides the light incident from the second optical system 31 to the third optical system 33 by reflecting the light in the direction X2. In addition, the branch member 32 guides subject light that is incident on the lens 34 from the screen SC side and passes through the third optical system 33, to the fourth optical system 37 by allowing transmission of the subject light. The branch member 32 is configured with, for example, a half mirror, a beam splitter, or a polarization member.

The third optical system 33 includes at least one lens and guides the light reflected by the branch member 32 to the lens 34. For example, a focus lens for adjusting a focal position of the optical system (focal position of the image projected to the screen SC), a zoom lens for adjusting a focal length of the optical system, or a variable stop having a variable transmitted light quantity may be included in the third optical system 33. The focus lens constitutes a focal position adjustment optical system having a variable focal position. The focus lens may be configured to be included in the first optical system 21 or the second optical system 31 instead of the third optical system 33.

The lens 34 is arranged in an end part of the second member 3 on the direction X2 side and covers an opening 3c formed in the end part. The lens 34 projects the light incident from the third optical system 33 to the screen SC.

The fourth optical system 37 is arranged adjacent to the branch member 32 on the direction X1 side and guides, to the imaging element 38, the subject light that is transmitted through the branch member 32 and travels in the direction X1. An optical axis of the fourth optical system 37 approximately matches optical axes of the lens 34 and the third optical system 33.

The imaging element 38 is a charge coupled device (CCD) image sensor, a complementary metal oxide semiconductor (CMOS) image sensor, or the like. The imaging element 38 images the screen SC through the lens 34, the third optical system 33, the branch member 32, and the fourth optical system 37. A captured image signal of the imaging element 38 is input into an image processing portion 39 described later. The lens 34, the third optical system 33, and the branch member 32 constitute a part of the optical system.

Figure 4:
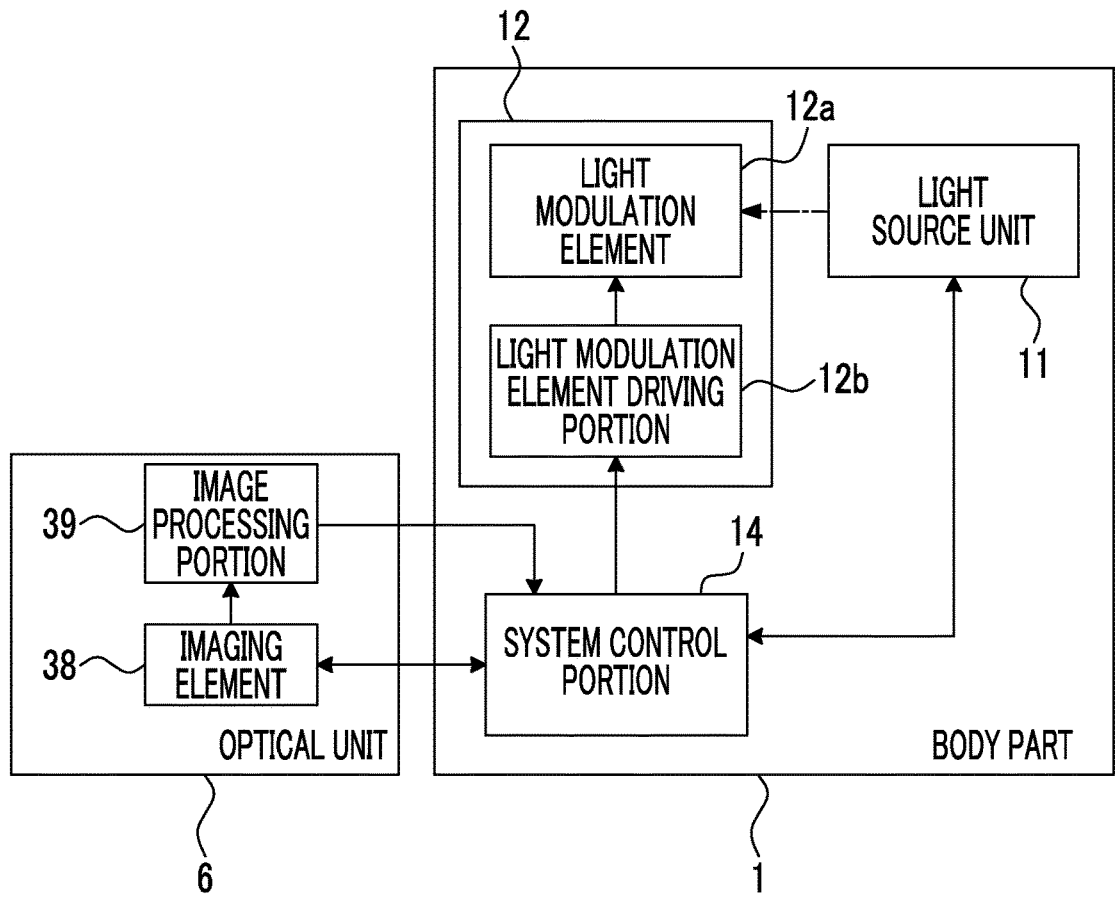
FIG. 4 is a schematic diagram illustrating an internal block configuration of the projector 100 illustrated in FIG. 1.

FIG. 4 is a schematic diagram illustrating an internal block configuration of the projector 100 illustrated in FIG. 1. The light source unit 11, the light modulation unit 12 including the light modulation element 12a and a light modulation element driving portion 12b driving the light modulation element 12a, and a system control portion 14 controlling the entire projector 100 are disposed in the body part 1 of the projector 100. The imaging element 38 and the image processing portion 39 that generates captured image data by processing the captured image signal input from the imaging element 38 are disposed in the optical unit 6. The captured image data generated by the image processing portion 39 is input into the system control portion 14. An imaging portion is configured with the imaging element 38 and the image processing portion 39.

The light modulation element driving portion 12b drives the light modulation element 12a based on the input image data input from the system control portion 14 and spatially modulates the light from the light source unit 11 using the input image data. The input image data is not limited to image data input from an external apparatus such as a personal computer, a smartphone, or a tablet terminal and may be input image data generated inside the projector 100. In addition, a data format of the input image data may be any of digital data and analog data after digital to analog conversion.

The system control portion 14 comprises various processors, a read only memory (ROM), and a random access memory (RAM).

The various processors include a central processing unit (CPU) that is a general-purpose processor performing various types of processing by executing a program, a programmable logic device (PLD) such as a field programmable gate array (FPGA) that is a processor having a circuit configuration changeable after manufacturing, a dedicated electric circuit such as an application specific integrated circuit (ASIC) that is a processor having a circuit configuration dedicatedly designed to execute a specific type of processing, or the like. A structure of these various processors is more specifically an electric circuit in which circuit elements such as semiconductor elements are combined.

The processors of the system control portion 14 may be configured with one of the various processors or may be configured with a combination of two or more processors of the same type or different types (for example, a combination of a plurality of FPGAs or a combination of a CPU and an FPGA).

Figure 5:
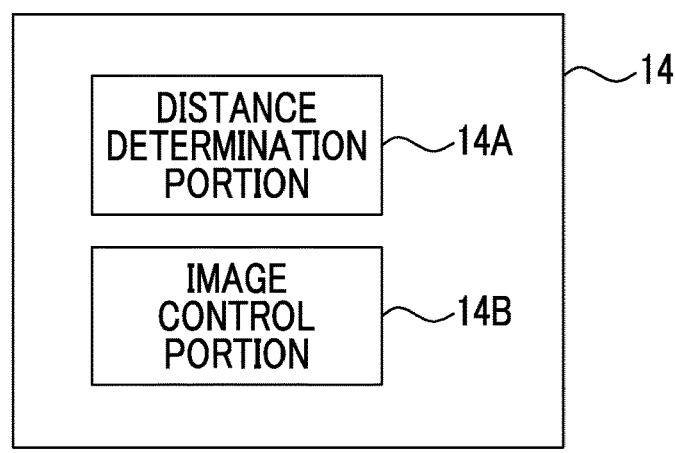
FIG. 5 is a function block diagram of a system control portion 14 illustrated in FIG. 4.

FIG. 5 is a function block diagram of the system control portion 14 illustrated in FIG. 4. The processors of the system control portion 14 function as a control device comprising a distance determination portion 14A and an image control portion 14B by executing a control program.

The distance determination portion 14A acquires first captured image data of the image G1 projected to the screen SC from the imaging portion (specifically, the image processing portion 39) and determines a distance from an object (for example, a head or a hand of a person) present between the screen SC and the optical system of the optical unit 6 to the optical system based on a sharpness (first sharpness) of the entire first captured image data and a sharpness (second sharpness) of the input image data that is a base of the image G1.

A sharpness of image data is an indicator representing how sharp the image data is (sharpness), in other words, a degree of blurriness. For example, various evaluation values such as a contrast value of the image data can be used as the sharpness.

The first captured image data includes the image G1 and a background part (the screen SC and the object) to which the image G1 is projected. The image G1 included in the first captured image data constitutes a part of the first captured image data. The image G1 and the background part included in the first captured image data constitute the entire first captured image data.

The image control portion 14B controls the input image data to be input into the light modulation element 12a based on the distance from the optical system to the object determined by the distance determination portion 14A. Specifically, in a case where this distance is a distance indicating that the object is present near the screen SC, the image control portion 14B determines that a touch operation is performed on the screen SC, and performs a control corresponding to the touch operation, that is, changes the input image data. Accordingly, the image G1 projected to the screen SC can be changed to another image by the touch operation.

Figure 6:
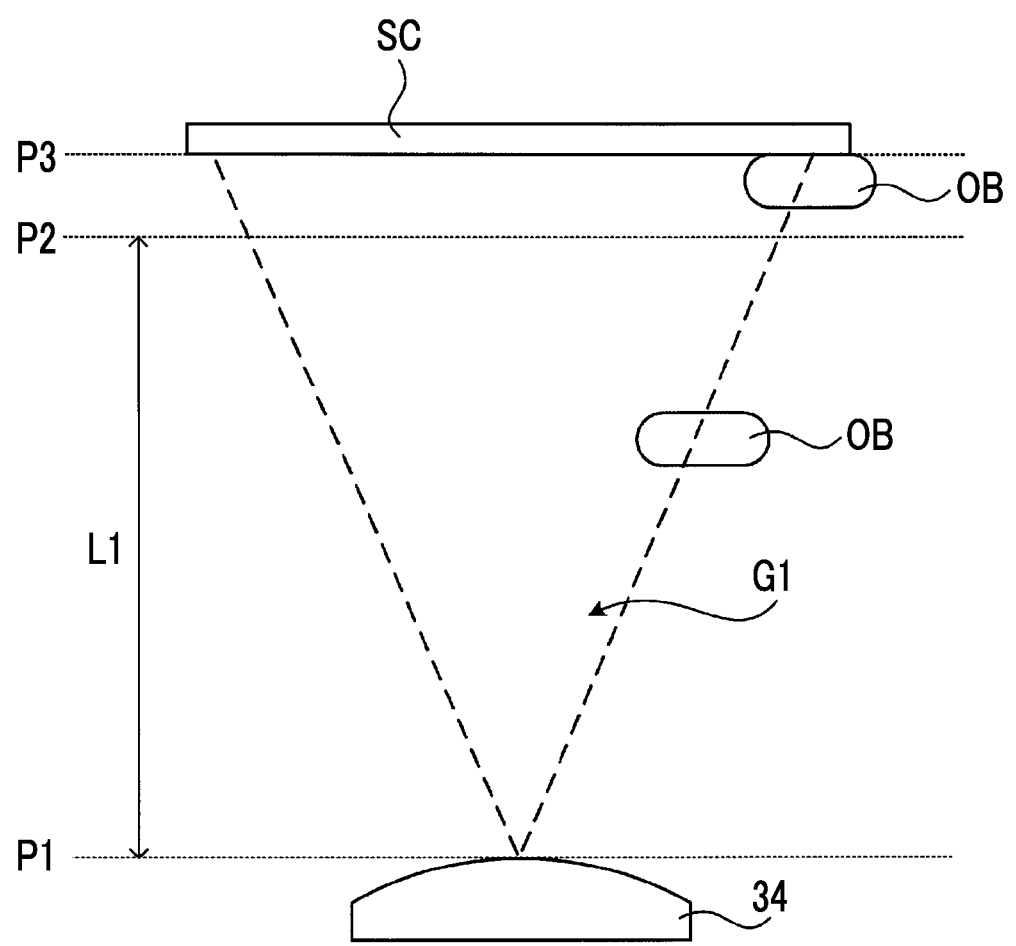
FIG. 6 is a schematic diagram for describing a principle of determination of a distance to an object by a distance determination portion 14A.

FIG. 6 is a schematic diagram for describing a principle of determination of the distance to the object by the distance determination portion 14A. FIG. 6 illustrates the screen SC and the lens 34 positioned closest to the screen SC side in the optical system of the optical unit 6. In addition, FIG. 6 illustrates a position P1 of an end part of the lens 34 on the screen SC side in the direction X and a position P3 of an end part of the screen SC on the lens 34 side in the direction X. In addition, FIG. 6 illustrates a position P2 between the position P3 and the position P1 near the position P3. A focusing position of the image G1 projected to the screen SC from the optical unit 6 is set to the position P3.

FIG. 7 is a schematic diagram illustrating an example of input image data g1 and the image G1 based on the input image data g1. In a case where the input image data g1 illustrated in FIG. 7 is input into the light modulation element 12a, the image G1 based on the input image data g1 is projected to the screen SC. Here, as illustrated in FIG. 6, in a case where an object OB such as the finger of the person is present on a path of passage of the image G1, a state where a part of the image G1 is projected to the object OB instead of being projected to the screen SC is set as illustrated in FIG. 7. Accordingly, captured image data IP obtained by capturing the image G1 illustrated in FIG. 7 using the imaging element 38 is data (data including an object region ob corresponding to the object OB) illustrated in FIG. 8.

Figure 8:
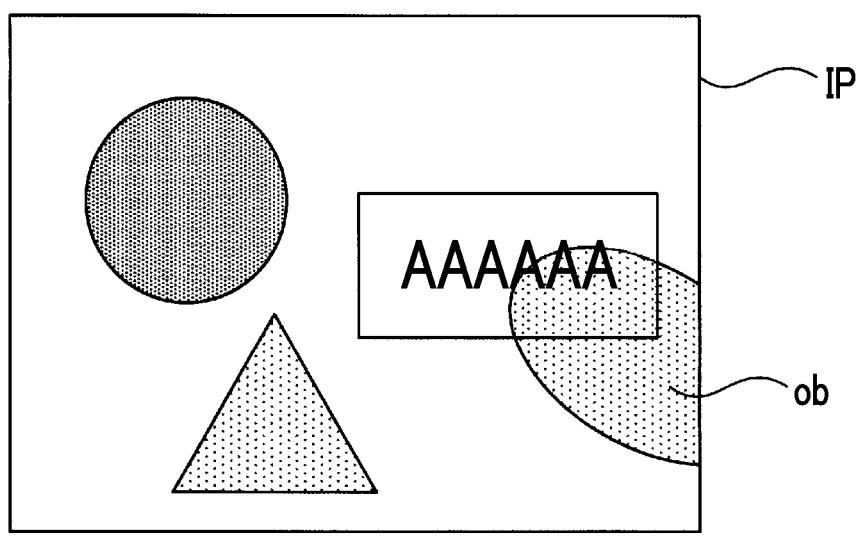
FIG. 8 is a schematic diagram illustrating an example of captured image data IP obtained by capturing the image G1 illustrated in FIG. 7 using an imaging element 38.

Here, a case where the object OB is present between the position P2 and the position P1 illustrated in FIG. 6 is assumed. In this case, the object OB is present at a position separated far from the focusing position of the image G1. Thus, a sharpness of the object region ob in the captured image data IP illustrated in FIG. 8 is significantly decreased with respect to a sharpness of a region corresponding to the object region ob in the input image data g1. That is, a value of a difference between a sharpness C1 of the input image data g1 and a sharpness C2 of the captured image data IP is large (for example, greater than or equal to a second threshold value TH2 described later).

In addition, a case where the object OB is present between the position P3 and the position P2 illustrated in FIG. 6 is assumed. In this case, the object OB is present near the focusing position of the image G1. Thus, the sharpness of the object region ob in the captured image data IP illustrated in FIG. 8 is slightly decreased with respect to the sharpness of the region corresponding to the object region ob in the input image data g1. That is, the value of the difference between the sharpness C1 of the input image data g1 and the sharpness C2 of the captured image data IP is smaller (for example, a value within a range of greater than or equal to a first threshold value TH1 described later and less than the second threshold value TH2) than in a case where the object OB is present between the position P2 and the position P1.

Furthermore, a case where the object OB illustrated in FIG. 6 is not present is assumed. In this case, the sharpness C1 of the input image data g1 and the sharpness C2 of the captured image data IP have almost the same values. That is, the value of the difference between the sharpness C1 and the sharpness C2 is smaller (for example, less than the first threshold value TH1 described later) than in a case where the object OB is present between the position P3 and the position P2.

The distance determination portion 14A determines presence or absence of the object OB and a magnitude of the distance from the optical system to the object OB using a magnitude of the difference between the sharpness of the input image data g1 and the sharpness of the first captured image data obtained by capturing the image G1 in a state where the image G1 is projected to the screen SC.

Figure 9:
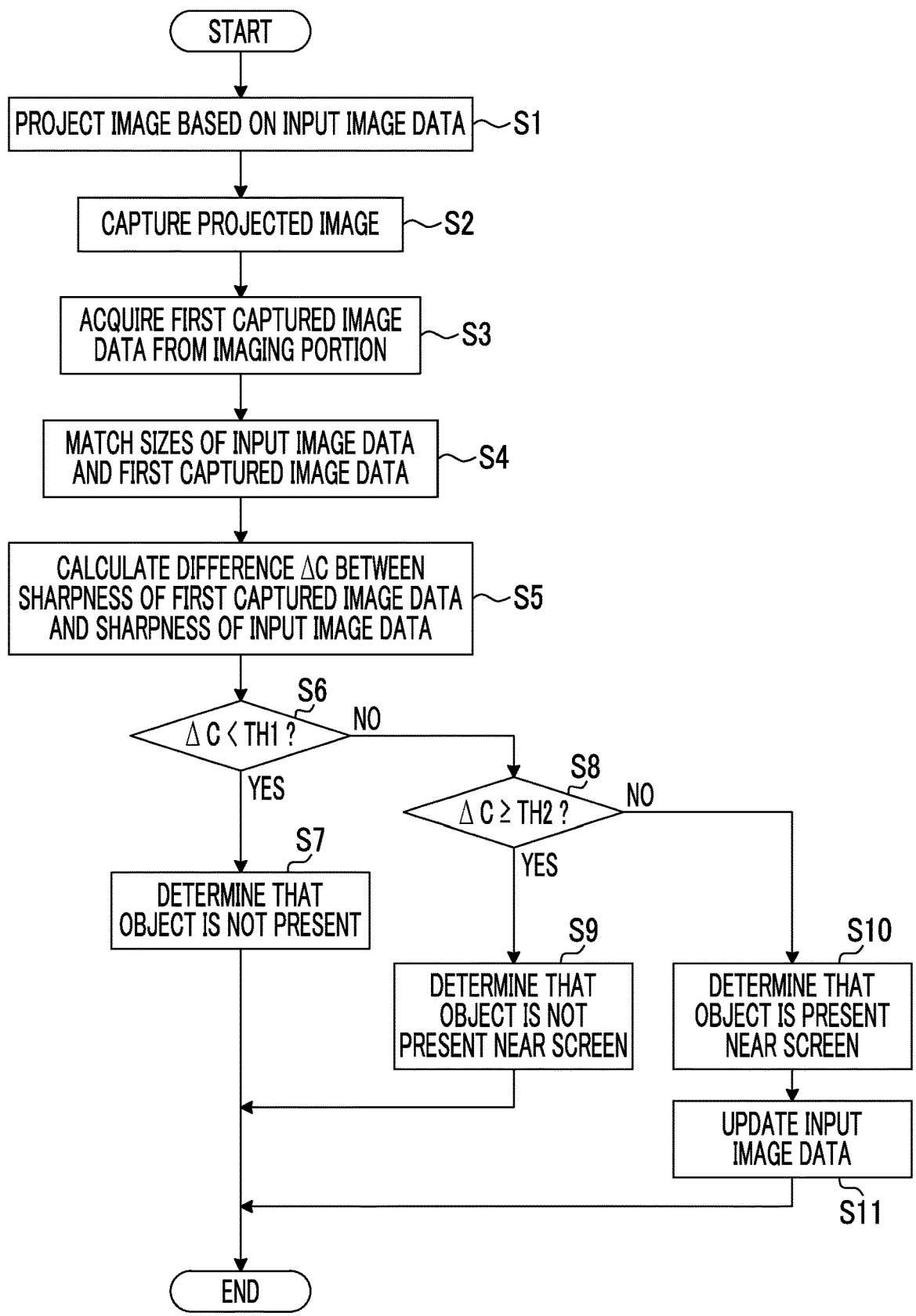
FIG. 9 is a flowchart for describing a gesture detection operation of the projector 100.

FIG. 9 is a flowchart for describing a gesture detection operation of the projector 100. The image control portion 14B of the system control portion 14 projects the image G1 based on the input image data g1 to the screen SC by acquiring the input image data g1 and inputting the input image data g1 into the light modulation element 12a (step S1).

Next, the distance determination portion 14A of the system control portion 14 images, by driving the imaging element 38, the screen SC to which the image G1 is projected (step S2). In a case where the captured image signal is output from the imaging element 38 by imaging in step S2, the captured image data is generated by processing the captured image signal using the image processing portion 39. The distance determination portion 14A acquires, from the image processing portion 39, the first captured image data that is a part of the captured image data corresponding to the image G1 (step S3).

Next, the distance determination portion 14A performs processing of matching sizes of the input image data g1 and the first captured image data (step S4). In step S4, the distance determination portion 14A may further perform processing of matching brightness of the input image data g1 and the first captured image data.

Next, the distance determination portion 14A derives each of the sharpness C1 of the input image data g1 and the sharpness C2 of the first captured image data and derives a difference ΔC (absolute value) between the sharpness C1 and the sharpness C2 (step S5).

Next, the distance determination portion 14A determines whether or not the difference ΔC is less than the first threshold value TH1 (step S6). In a case where the difference ΔC is less than the first threshold value TH1 (step S6: YES), the distance determination portion 14A determines that an object that blocks the image G1 being projected is not present (step S7), and finishes processing without detecting a gesture.

In a case where the difference ΔC is greater than or equal to the first threshold value TH1 (step S6: NO), the distance determination portion 14A determines that the object blocking the image G1 being projected is present, and determines whether or not the difference ΔC is greater than or equal to the second threshold value TH2 (step S8).

In a case where the difference ΔC is greater than or equal to the second threshold value TH2 (step S8: YES), the distance determination portion 14A determines that the distance from the optical system to the object is less than a first distance L1 that is a distance between the position P1 and the position P2 illustrated in FIG. 6, in other words, the object is not present near the screen SC (step S9), and finishes processing without detecting a gesture.

In a case where the difference ΔC is less than the second threshold value TH2 (step S8: NO), the distance determination portion 14A determines that the distance from the optical system to the object is greater than or equal to the first distance L1, in other words, the object is present near the screen SC (that is, a gesture (touch operation on the screen SC) is performed) (step S10).

After step S10, for example, the image control portion 14B performs a control for updating a part of the input image data g1 or changing the input image data g1 to another input image data based on a position of the object region in the first captured image data (step S11).

In step S5 in FIG. 9, the distance determination portion 14A may calculate a ratio of two sharpnesses and determine the distance from the optical system to the object based on the ratio. For example, the distance determination portion 14A uses a value obtained by dividing the sharpness C1 of the input image data g1 by the sharpness C2 of the first captured image data as the ratio. In a case where the ratio is "1", processing of the distance determination portion 14A transitions to step S7. In addition, in a case where the ratio is greater than "1" and less than a threshold value th1, processing of the distance determination portion 14A transitions to step S10. In addition, in a case where the ratio is greater than or equal to the threshold value th1, processing of the distance determination portion 14A transitions to step S9.

As described above, according to the projector 100, the distance from the optical system to the object blocking the image G1 can be determined based on the sharpness of the input image data g1 and the sharpness of the first captured image data. In this determination, expensive hardware for an infrared ray, a stereo camera, or the like and complex operations are not necessary. Thus, the distance to the object can be determined at a low cost and a small load.

Figure 10:
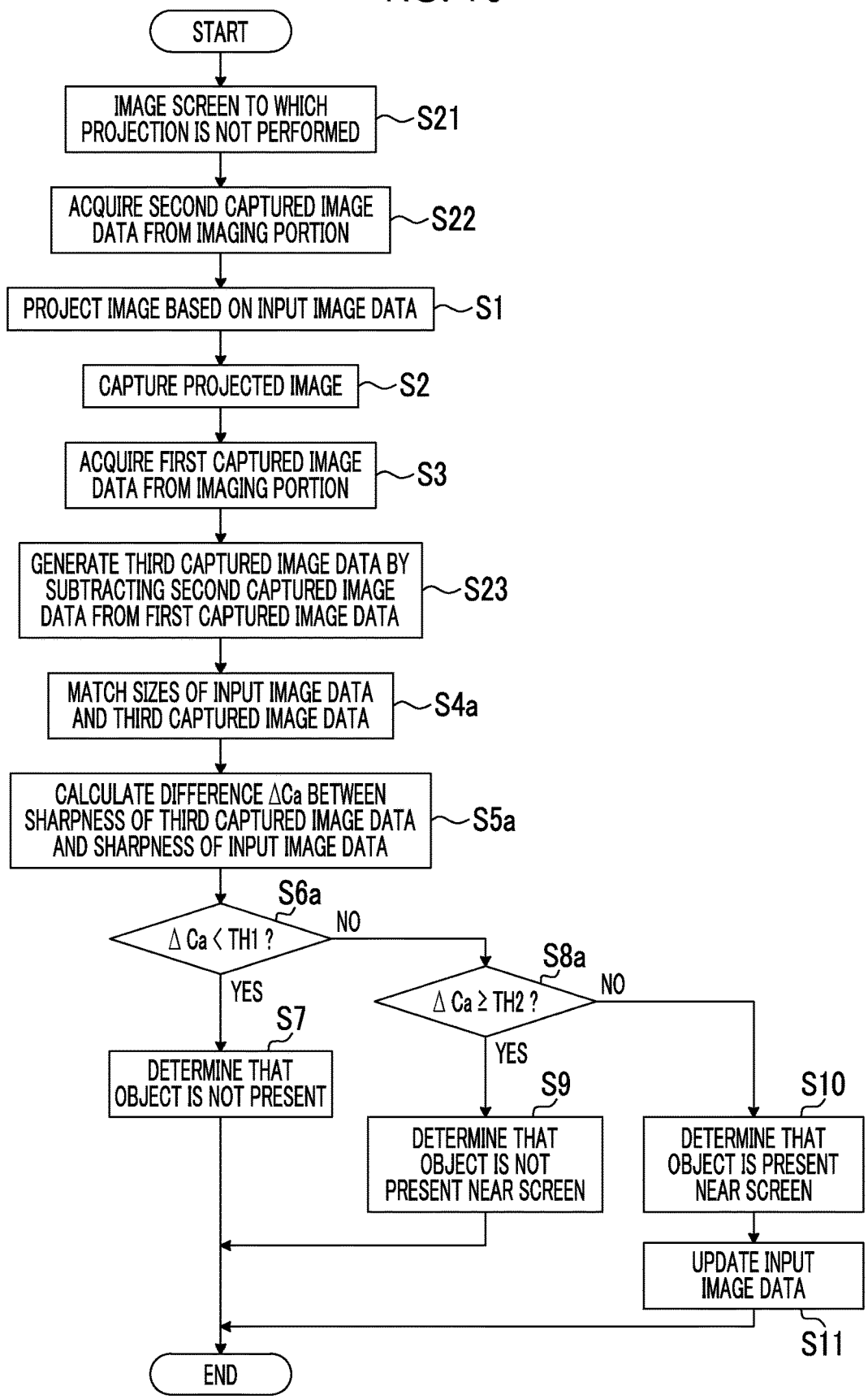
FIG. 10 is a flowchart for describing a modification example of the gesture detection operation of the projector 100.

FIG. 10 is a flowchart for describing a modification example of the gesture detection operation of the projector 100. In FIG. 10, the same processing as in FIG. 9 is designated by the same reference numerals, and descriptions of such processing will not be repeated.

Before step S1, the distance determination portion 14A images the screen SC by driving the imaging element 38 in a state where the image G1 is not projected to the screen SC (step S21). In a case where the captured image signal is output from the imaging element 38 by imaging in step S21, the captured image data is generated by processing the captured image signal using the image processing portion 39. The distance determination portion 14A acquires, from the image processing portion 39, second captured image data that is a part of the captured image data corresponding to a projection range of the image G1 (step S22).

After step S22, in a case where processing of step S1 to step S3 is performed, the distance determination portion 14A generates third captured image data by subtracting the second captured image data from the first captured image data (step S23).

FIG. 11 is a diagram illustrating an example of second captured image data IP2 acquired in step S22, first captured image data IP1 acquired in step S3, and third captured image data IP3 generated in step S23.

The object region ob in the first captured image data IP1 illustrated in FIG. 11 is obtained in a state where a part of the image G1 overlaps with the object OB. Thus, in a case where a complex pattern is present in the object OB (for example, a case where a part of patterned clothes blocks the image G1 is assumed), imaging is performed in a state where the complex pattern overlaps with a part of the image G1. In this case, there is a possibility that a sharpness of the entire first captured image data IP1 is increased above the sharpness of the input image data g1 even in a case where the object OB is present near the screen SC.

In a case where the second captured image data IP2 is subtracted from the first captured image data IP1 illustrated in FIG. 11, the third captured image data IP3 in which the object OB is removed can be obtained. Meanwhile, a region ob1 in the third captured image data IP3 is a part in which the image G1 is projected to a side in front of the screen SC. Thus, a sharpness of the region ob1 is decreased compared to the other region of the third captured image data IP3. Thus, the distance to the object OB can be determined based on the sharpness of the first captured image data IP1 and the sharpness of the third captured image data.

In a case where the third captured image data is generated in step S23, the distance determination portion 14A performs processing of matching sizes of the input image data g1 and the third captured image data (step S4a).

Next, the distance determination portion 14A derives each of the sharpness C1 of the input image data g1 and a sharpness C3 of the third captured image data and derives a difference ΔCa (absolute value) between the sharpness C1 and the sharpness C3 (step S5a). In the present modification example, the sharpness C3 constitutes a first sharpness.

Next, the distance determination portion 14A determines whether or not the difference ΔCa is less than the first threshold value TH1 (step S6a). In a case where the difference ΔCa is less than the first threshold value TH1 (step S6a: YES), processing of the distance determination portion 14A transitions to step S7.

In a case where the difference ΔC is greater than or equal to the first threshold value TH1 (step S6a: NO), the distance determination portion 14A determines that the object blocking the image G1 being projected is present, and determines whether or not the difference ΔCa is greater than or equal to the second threshold value TH2 (step S8a).

In a case where the difference ΔCa is greater than or equal to the second threshold value TH2 (step S8a: YES), processing of the distance determination portion 14A transitions to step S9. In a case where the difference ΔCa is less than the second threshold value TH2 (step S8a: NO), processing of the distance determination portion 14A transitions to step S10.

As described above, the distance from the optical system to the object blocking the image G1 can be determined based on the sharpness of the input image data g1 and the sharpness of the third captured image data. By using the third captured image data, the distance to the object OB can be accurately determined even in a case where the object OB includes a pattern causing high contrast. The third captured image data described here is image data in which the part of the object OB and the part of the screen SC (that is, the background part) in the first captured image data IP1 are removed. That is, the third captured image data can be said to be a part of the first captured image data.

Even in the modification example illustrated in FIG. 10, a ratio of the sharpness of the input image data g1 and the sharpness of the third captured image data can be used instead of the difference ΔCa.

In addition, in the description in FIG. 10, the third captured image data is generated by subtracting the second captured image data from the first captured image data. However, the third captured image data may be obtained by removing the background part included in the first captured image data. For example, the third captured image data in which the background part is removed may be generated by obtaining a brightness ratio between each pixel of the first captured image data and each pixel of the second captured image data and multiplying each pixel of the first captured image data by the brightness ratio.

Figure 12:
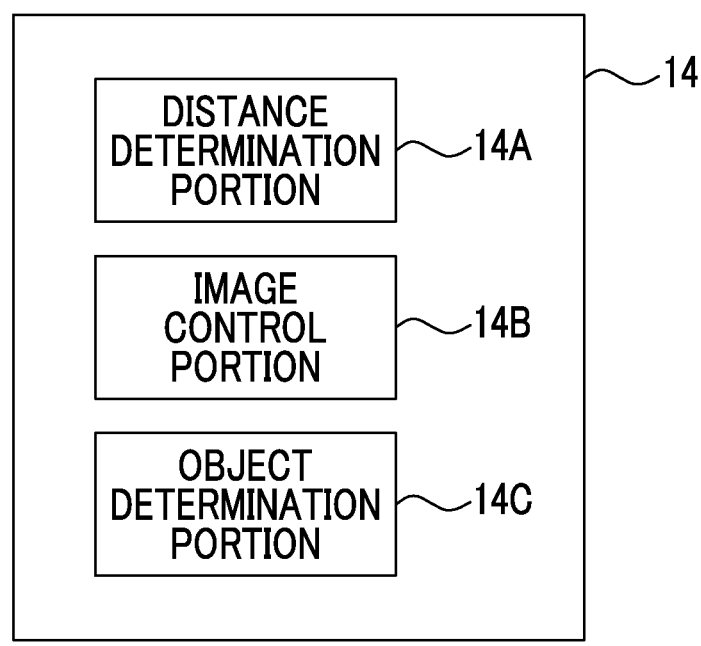
FIG. 12 is a diagram illustrating a first modification example of the function blocks of the system control portion 14 illustrated in FIG. 4.

FIG. 12 is a diagram illustrating a first modification example of the function blocks of the system control portion 14 illustrated in FIG. 4. The processors of the system control portion 14 function as a control device comprising the distance determination portion 14A, the image control portion 14B, and an object determination portion 14C by executing the control program.

Before processing of distance determination by the distance determination portion 14A, the object determination portion 14C determines the presence or absence of the object present between the screen SC and the optical system based on the captured image data output from the image processing portion 39.

Functions of the distance determination portion 14A and the image control portion 14B illustrated in FIG. 12 are the same as described above. However, the distance determination portion 14A determines the distance to the object only in a case where the object determination portion 14C determines that the object is present between the screen SC and the optical system.

Figure 13:
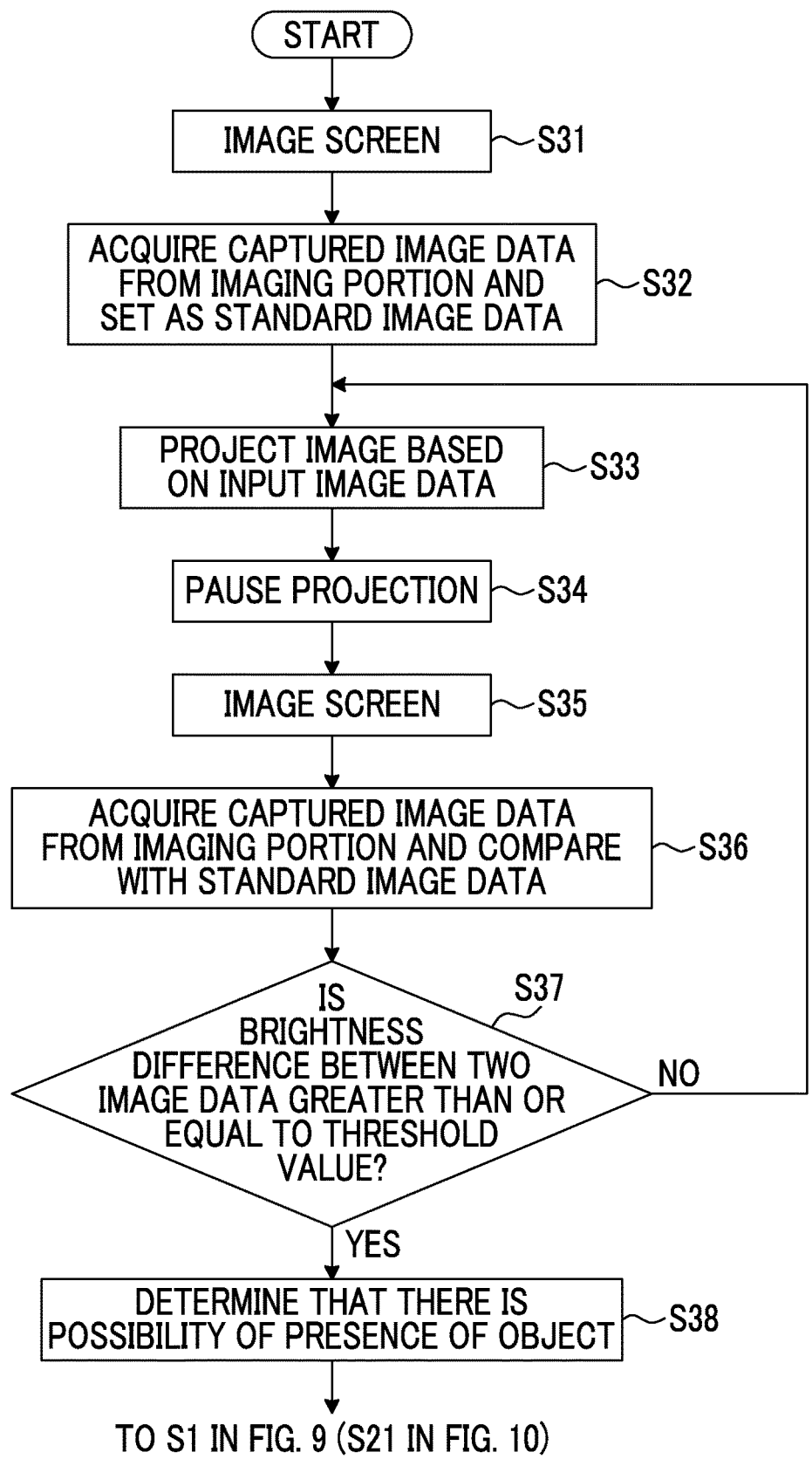
FIG. 13 is a flowchart for describing a gesture detection operation by the system control portion 14 illustrated in FIG. 12.

FIG. 13 is a flowchart for describing a gesture detection operation by the system control portion 14 illustrated in FIG. 12.

In a case where the projector 100 is powered on, first, the object determination portion 14C images the screen SC by driving the imaging element 38 in a state where the image G1 is not projected to the screen SC (step S31). In a case where the captured image signal is output from the imaging element 38 by imaging in step S31, the captured image data is generated by processing the captured image signal using the image processing portion 39. The object determination portion 14C acquires image data of the part of the captured image data corresponding to the projection range of the image G1 from the image processing portion 39, sets the image data as standard image data, and stores the image data in the RAM (step S32).

Next, the image control portion 14B projects the image G1 based on the input image data g1 to the screen SC by acquiring the input image data g1 and inputting the input image data g1 into the light modulation element 12a (step S33).

Next, the object determination portion 14C temporarily pauses projection of the image G1 (step S34). In a state where projection of the image G1 is paused, the object determination portion 14C images the screen SC by driving the imaging element 38 (step S35). In a case where the captured image signal is output from the imaging element 38 by imaging in step S35, the captured image data is generated by processing the captured image signal using the image processing portion 39. The object determination portion 14C acquires the part of the captured image data corresponding to the projection range of the image G1 from the image processing portion 39 and compares the part with the standard image data (step S36).

As a result of comparison, in a case where a brightness difference between two image data is less than a threshold value (step S37: NO), processing returns to step S33. A time period from processing in step S34 until processing in step S33 is a short time period that cannot be sensed by a person.

In a case where the brightness difference between two image data is greater than or equal to the threshold value (step S37: YES), processing transitions to step S38. In step S38, the object determination portion 14C determines that there is a possibility of presence of the object blocking the image G1. In a case where processing in step S38 is performed, processing from step S1 in FIG. 9 or processing from step S21 in FIG. 10 is started.

In step S37 and step S38, the presence or absence of the object is determined using a magnitude of the brightness difference between two image data. However, for example, difference image data between two image data may be generated, and in a case where edges are included in the difference image data, it may be determined that there is a possibility of presence of the object in a part surrounded by the edges.

As described above, by performing the processing illustrated in FIG. 9 or FIG. 10 only in a case where there is a possibility of presence of the object blocking the image G1, an increase in processing amount of the system control portion 14 can be prevented.

In a case where a NO determination is made in step S37 in FIG. 13, the object determination portion 14C may reset the captured image data as the standard image data by rewriting the standard image data stored in the RAM with the captured image data acquired in step S36. By doing so, even in a case where brightness of an environment in which the screen SC is placed changes after a start of the projector 100, the presence or absence of the object can be determined with high accuracy.

In addition, in FIG. 13, the presence or absence of the object blocking the projected image is determined by comparing two captured image data obtained by imaging the screen SC at different timings in a state where the image is not projected. As a modification example, the object determination portion 14C may determine the presence or absence of the object blocking the projected image by comparing two captured image data obtained by imaging the screen SC at different timings in a state where the image is projected.

Figure 14:
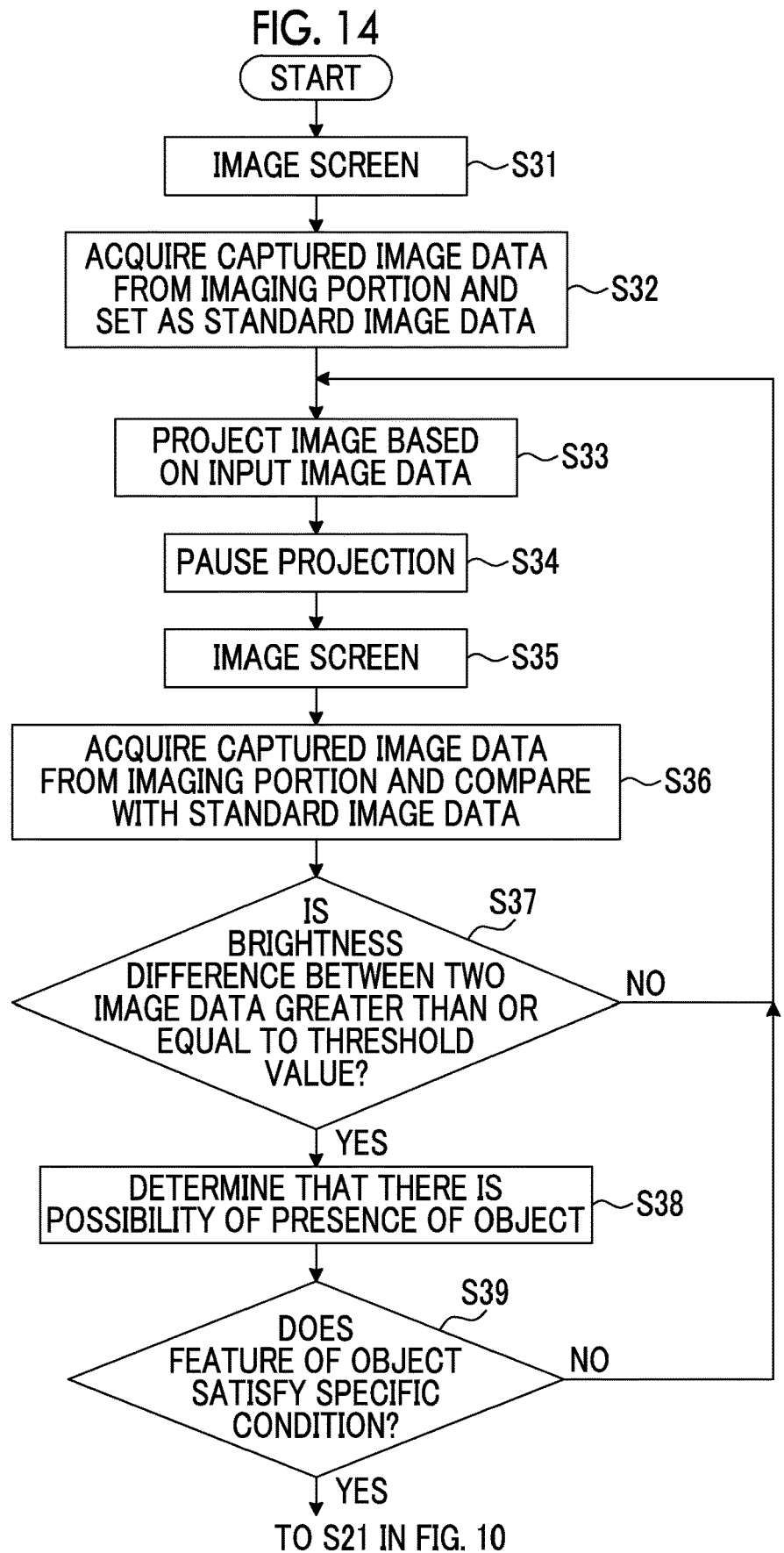
FIG. 14 is a flowchart for describing a modification example of the gesture detection operation by the system control portion 14 illustrated in FIG. 12.

FIG. 14 is a flowchart for describing a modification example of the gesture detection operation by the system control portion 14 illustrated in FIG. 12. The flowchart illustrated in FIG. 14 is the same as the flowchart illustrated in FIG. 13 except that step S39 is added. In FIG. 14, the same processing as in FIG. 13 is designated by the same reference numerals, and descriptions of such processing will not be repeated.

In a case where it is determined that there is a possibility of presence of the object in step S38, the object determination portion 14C determines whether or not a feature of the object satisfies a specific condition (step S39).

Specifically, the object determination portion 14C generates difference image data between two captured image data used for comparison in step S37. The difference image data is image data indicating the object. The object determination portion 14C obtains a frequency (spatial frequency) of the difference image data. In a case where the frequency is greater than or equal to a predetermined value, the object determination portion 14C determines that the feature of the object does not satisfy the specific condition. In a case where the frequency is less than the predetermined value, the object determination portion 14C determines that the feature of the object satisfies the specific condition. In this example, the frequency is the feature of the object, and a condition that the frequency is less than the predetermined value (in other words, the object does not include a detailed pattern) is the specific condition.

In a case where it is determined that the feature of the object satisfies the specific condition in step S39, processing from step S21 in FIG. 10 is performed. According to the operation illustrated in FIG. 14, the processing in FIG. 10 is performed only in a case where the object blocking the image projected to the screen SC does not include a complex pattern causing a high spatial frequency. While the processing in FIG. 10 can eliminate an effect of the pattern of the object, performing processing in step S39 in FIG. 14 can more powerfully eliminate the effect.

Even in the flowchart in FIG. 14, the modification example (updating the standard image data in a case where a NO determination is made in step S37, and determining the presence or absence of the object blocking the projected image by comparing two captured image data obtained by imaging the screen SC at different timings in a state where the image is projected) described in FIG. 13 can be applied.

Figure 15:
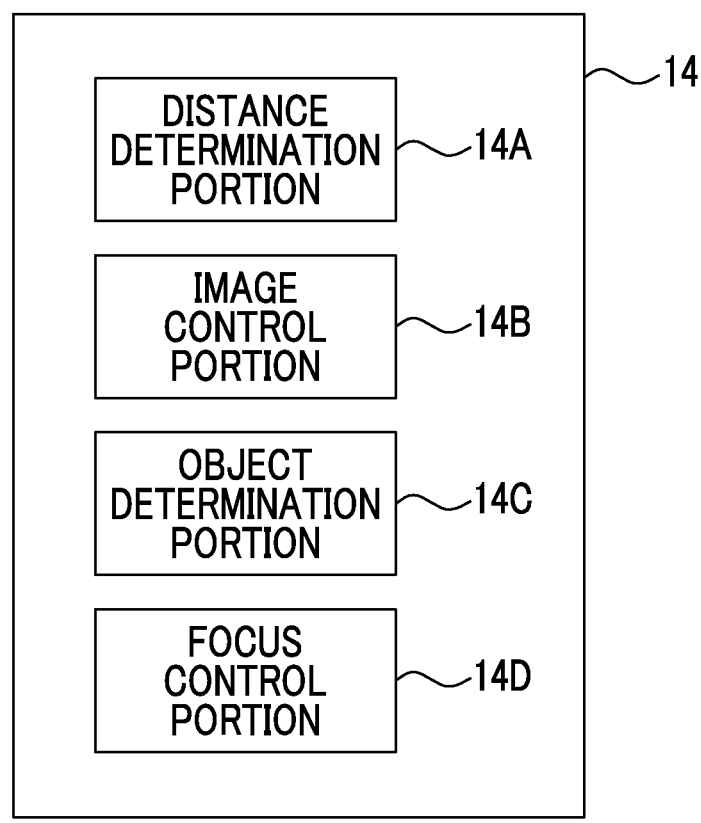
FIG. 15 is a diagram illustrating a second modification example of the function blocks of the system control portion 14 illustrated in FIG. 4.

FIG. 15 is a diagram illustrating a second modification example of the function blocks of the system control portion 14 illustrated in FIG. 4. The processors of the system control portion 14 function as a control device comprising the distance determination portion 14A, the image control portion 14B, the object determination portion 14C, and a focus control portion 14D by executing the control program. In the second modification example, it is assumed that the focus lens is included in the optical system included in the optical unit 6.

Functions of the distance determination portion 14A, the image control portion 14B, and the object determination portion 14C illustrated in FIG. 15 are the same as in FIG. 12. Thus, descriptions of the functions will not be repeated.

In a case where the object determination portion 14C determines that the object is not present, the focus control portion 14D controls the focal position of the optical system by controlling the focus lens.

Figure 16:
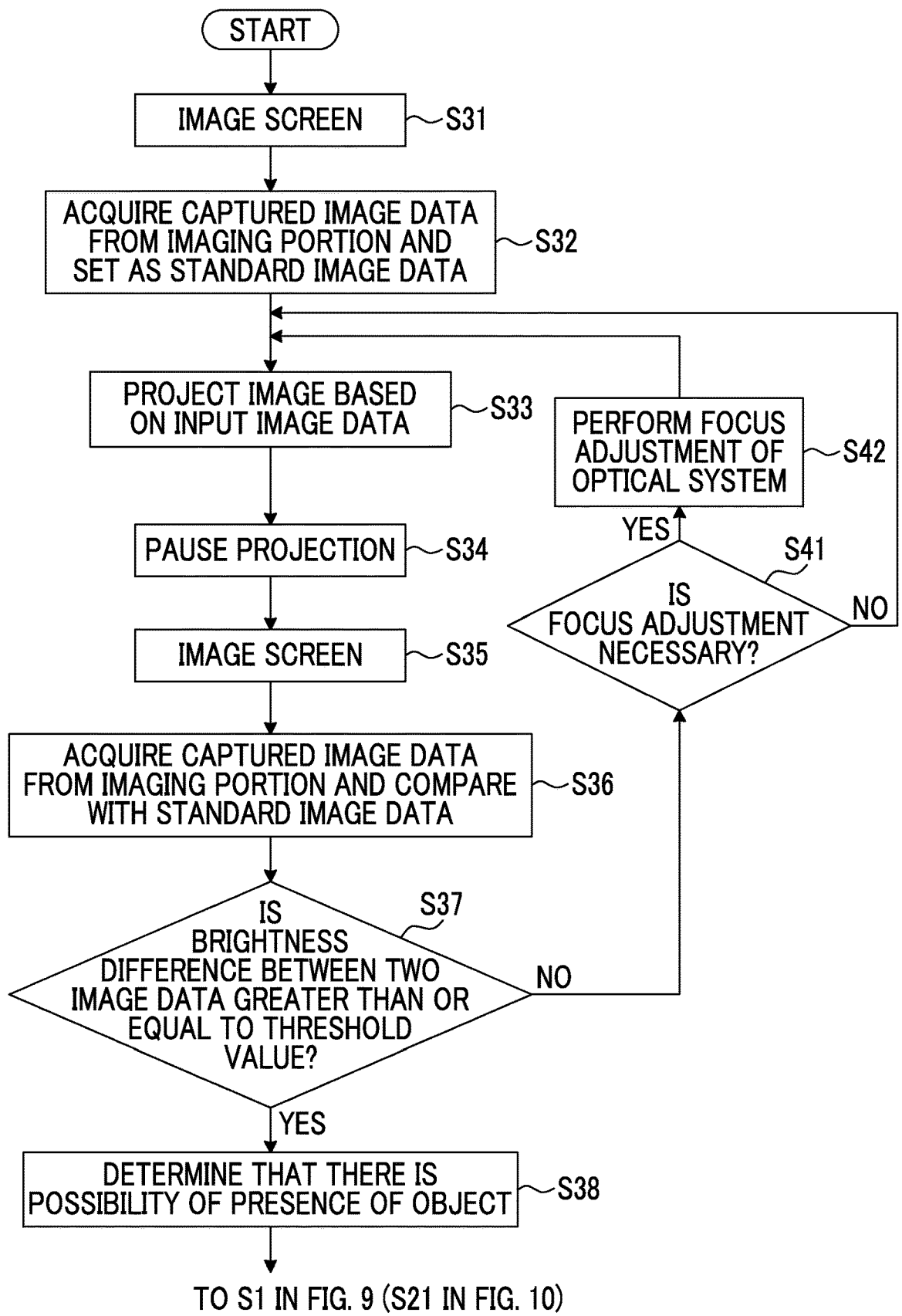
FIG. 16 is a flowchart for describing a gesture detection operation by the system control portion 14 illustrated in FIG. 15.

FIG. 16 is a flowchart for describing a gesture detection operation by the system control portion 14 illustrated in FIG. 15. The flowchart illustrated in FIG. 16 is the same as the flowchart illustrated in FIG. 13 except that step S41 and step S42 are added. In FIG. 16, the same processing as in FIG. 13 is designated by the same reference numerals, and descriptions of such processing will not be repeated.

In a case where a NO determination is made in step S37, the focus control portion 14D determines whether or not focus adjustment of the optical system is necessary based on the captured image data acquired in step S36 (step S41). For example, the focus control portion 14D obtains the sharpness of the captured image data. In a case where the sharpness is less than or equal to a predetermined value, the focus control portion 14D determines that the focus adjustment is necessary.

In a case where it is determined that the focus adjustment is necessary (step S41: YES), the focus control portion 14D decides a driving amount of the focus lens using a contrast auto focus (AF) method, a phase difference AF method, or the like and adjusts the focal position by driving the focus lens in accordance with the driving amount (step S42). After step S42, processing transitions to step S33. Even in a case where a NO determination is made in step S41, processing transitions to step S33.

In the flowchart illustrated in FIG. 14, in each of a case where a NO determination is made in step S37, and a case where a NO determination is made in step S39, processing in step S41 and step S42 in FIG. 16 may be performed.

Even in the flowchart in FIG. 16, the modification example (updating the standard image data in a case where a NO determination is made in step S37, and determining the presence or absence of the object blocking the projected image by comparing two captured image data obtained by imaging the screen SC at different timings in a state where the image is projected) described in FIG. 13 can be applied.

According to the operation illustrated in FIG. 16, the focus adjustment of the optical system is performed in a state where the object determination portion 14C determines that the object is not present. Thus, a focused image can be projected onto the screen SC by preventing focusing on the object in front of the screen SC.

In the operation illustrated in FIG. 16, in a case where a NO determination is made in step S37, the system control portion 14 automatically performs the focus adjustment. As a modification example, in a case where a NO determination is made in step S37, and a YES determination is made in step S41, the system control portion 14 may generate information for prompting adjustment of the focal position of the optical system. In this case, the system control portion 14 functions as an information generation portion. For example, the system control portion 14 generates the information for prompting adjustment of the focal position of the optical system by displaying a message on the display portion such as a liquid crystal display not illustrated, or outputting the message from a speaker not illustrated.

As described thus far, the following matters are disclosed in the present specification.

(1) A control device of a projection system including an optical system that projects an image generated in a display portion based on input image data to a projection object, and an imaging portion that images the projection object, the control device comprising a distance determination portion that acquires first captured image data of the image projected to the projection object from the imaging portion and determines a distance from an object present between the projection object and the optical system to the optical system based on a first sharpness of a part of or the entire first captured image data and a second sharpness of the input image data.

(2) The control device according to (1), in which the distance determination portion determines the distance based on a difference between the first sharpness and the second sharpness.

(3) The control device according to (2), in which in a state where the difference is greater than or equal to a first threshold value and less than a second threshold value, the distance determination portion determines that the distance is greater than or equal to a first distance, and in a state where the difference is greater than or equal to the second threshold value, the distance determination portion determines that the distance is less than the first distance.

(4) The control device according to (1), in which the distance determination portion determines the distance based on a ratio of the first sharpness and the second sharpness.

(5) The control device according to any one of (1) to (4), further comprising an image control portion that controls the input image data based on the distance.

(6) The control device according to (3), further comprising an image control portion that controls the input image data based on the distance, in which in a state where the distance is greater than or equal to the first distance, the image control portion changes the input image data.

(7) The control device according to any one of (1) to (6), in which the distance determination portion sets a sharpness of the entire first captured image data as the first sharpness.

(8) The control device according to any one of (1) to (6), in which the distance determination portion acquires second captured image data of the projection object in a state where the image is not projected to the projection object, from the imaging portion, generates third captured image data that is the part of the first captured image data based on the first captured image data and the second captured image data, and sets a sharpness of the third captured image data as the first sharpness.

(9) The control device according to (8), in which the distance determination portion generates the third captured image data by subtracting the second captured image data from the first captured image data.

(10) The control device according to any one of (1) to (9), further comprising an object determination portion that determines presence or absence of the object present between the projection object and the optical system based on captured image data output from the imaging portion, in which the distance determination portion determines the distance in a case where the object determination portion determines that the object is present.

(11) The control device according to (10), in which the object determination portion acquires captured image data of the projection object in a state where the image is not projected to the projection object, from the imaging portion and sets the acquired captured image data as standard image data, acquires captured image data of the projection object in a state where the standard image data is set and the image is not projected to the projection object, from the imaging portion, and determines the presence or absence of the object based on a comparison between the captured image data and the standard image data.

(12) The control device according to (10), in which the object determination portion acquires captured image data of the projection object in a state where the image is not projected to the projection object, at different timings from the imaging portion and determines the presence or absence of the object based on a comparison between the captured image data acquired at a first timing and the captured image data acquired at a second timing earlier than the first timing.

(13) The control device according to (10), in which the object determination portion acquires captured image data of the projection object in a state where the image is projected to the projection object, at different timings from the imaging portion and determines the presence or absence of the object based on a comparison between the captured image data acquired at a first timing and the captured image data acquired at a second timing earlier than the first timing.

(14) The control device according to any one of (1) to (6), in which the distance determination portion acquires second captured image data of the projection object in a state where the image is not projected to the projection object, from the imaging portion, generates third captured image data that is the part of the first captured image data based on the first captured image data and the second captured image data, and sets a sharpness of the third captured image data as the first sharpness, the control device further comprises an object determination portion that determines presence or absence of the object present between the projection object and the optical system based on captured image data output from the imaging portion, and the distance determination portion determines the distance in a case where the object determination portion determines that the object is present and a feature of the object satisfies a specific condition.

(15) The control device according to (14), in which the object determination portion acquires captured image data of the projection object in a state where the image is not projected to the projection object, from the imaging portion and sets the acquired captured image data as standard image data, acquires captured image data of the projection object in a state where the standard image data is set and the image is not projected to the projection object, from the imaging portion, and determines the presence or absence of the object based on a comparison between the captured image data and the standard image data, and in a case where the object determination portion determines that the object is present, the distance determination portion uses a frequency of the object obtained by the comparison between the captured image data and the standard image data as the feature.

(16) The control device according to (14), in which the object determination portion acquires captured image data of the projection object in a state where the image is not projected to the projection object, at different timings from the imaging portion and determines the presence or absence of the object based on a comparison between the captured image data acquired at a first timing and the captured image data acquired at a second timing earlier than the first timing, and in a case where the object determination portion determines that the object is present, the distance determination portion uses a frequency of the object obtained by the comparison between the two captured image data as the feature.

(17) The control device according to any one of (10) to (16), in which the optical system includes a focal position adjustment optical system having a variable focal position.

(18) The control device according to (17), further comprising a focus control portion that controls the focal position of the focal position adjustment optical system in a case where the object determination portion determines that the object is not present.

(19) The control device according to (17), further comprising an information generation portion that generates information for prompting adjustment of the focal position of the focal position adjustment optical system in a case where the object determination portion determines that the object is not present.

(20) The control device according to (19), in which the information generation portion displays the information on the display portion.

(21) The control device according to any one of (1) to (20), in which the imaging portion images the projection object through a part of the optical system.

(22) A projection system comprising the control device according to any one of (1) to (21), the optical system, and the imaging portion.

(23) A control method of a projection system including an optical system that projects an image generated in a display portion based on input image data to a projection object, and an imaging portion that images the projection object, the control method comprising a distance determination step of acquiring first captured image data of the image projected to the projection object from the imaging portion and determining a distance from an object present between the projection object and the optical system to the optical system based on a first sharpness of a part of or the entire first captured image data and a second sharpness of the input image data.

(24) The control method according to (23), in which in the distance determination step, the distance is determined based on a difference between the first sharpness and the second sharpness.

(25) The control method according to (24), in which in the distance determination step, in a state where the difference is greater than or equal to a first threshold value and less than a second threshold value, a determination that the distance is greater than or equal to a first distance is made, and in a state where the difference is greater than or equal to the second threshold value, a determination that the distance is less than the first distance is made.

(26) The control method according to (23), in which in the distance determination step, the distance is determined based on a ratio of the first sharpness and the second sharpness.

(27) The control method according to any one of (23) to (26), further comprising an image control step of controlling the input image data based on the distance.

(28) The control method according to (25), further comprising an image control step of controlling the input image data based on the distance, in which in the image control step, in a state where the distance is greater than or equal to the first distance, the input image data is changed.

(29) The control method according to any one of (23) to (28), in which in the distance determination step, a sharpness of the entire first captured image data is set as the first sharpness.

(30) The control method according to any one of (23) to (28), in which in the distance determination step, second captured image data of the projection object in a state where the image is not projected to the projection object is acquired from the imaging portion, third captured image data that is the part of the first captured image data is generated based on the first captured image data and the second captured image data, and a sharpness of the third captured image data is set as the first sharpness.

(31) The control method according to (30), in which in the distance determination step, the third captured image data is generated by subtracting the second captured image data from the first captured image data.

(32) The control method according to any one of (23) to (31), further comprising an object determination step of determining presence or absence of the object present between the projection object and the optical system based on captured image data output from the imaging portion, in which in the distance determination step, the distance is determined in a case where a determination that the object is present is made in the object determination step.

(33) The control method according to (32), in which in the object determination step, captured image data of the projection object in a state where the image is not projected to the projection object is acquired from the imaging portion and is set as standard image data, captured image data of the projection object in a state where the standard image data is set and the image is not projected to the projection object is acquired from the imaging portion, and the presence or absence of the object is determined based on a comparison between the captured image data and the standard image data.

(34) The control method according to (32), in which in the object determination step, captured image data of the projection object in a state where the image is not projected to the projection object is acquired at different timings from the imaging portion, and the presence or absence of the object is determined based on a comparison between the captured image data acquired at a first timing and the captured image data acquired at a second timing earlier than the first timing.

(35) The control method according to (32), in which in the object determination step, captured image data of the projection object in a state where the image is projected to the projection object is acquired at different timings from the imaging portion, and the presence or absence of the object is determined based on a comparison between the captured image data acquired at a first timing and the captured image data acquired at a second timing earlier than the first timing.

(36) The control method according to any one of (23) to (28), in which in the distance determination step, second captured image data of the projection object in a state where the image is not projected to the projection object is acquired from the imaging portion, third captured image data that is the part of the first captured image data is generated based on the first captured image data and the second captured image data, and a sharpness of the third captured image data is set as the first sharpness, an object determination step of determining presence or absence of the object present between the projection object and the optical system based on captured image data output from the imaging portion, in the distance determination step, the distance is determined in a case where a determination that the object is present and a feature of the object satisfies a specific condition is made in the object determination step.

(37) The control method according to (36), in which in the object determination step, captured image data of the projection object in a state where the image is not projected to the projection object is acquired from the imaging portion and is set as standard image data, captured image data of the projection object in a state where the standard image data is set and the image is not projected to the projection object is acquired from the imaging portion, and the presence or absence of the object is determined based on a comparison between the captured image data and the standard image data, and in a case where a determination that the object is present is made in the object determination step, a frequency of the object obtained by the comparison between the captured image data and the standard image data is used as the feature in the distance determination step.

(38) The control method according to (36), in which in the object determination step, captured image data of the projection object in a state where the image is not projected to the projection object is acquired at different timings from the imaging portion, and the presence or absence of the object is determined based on a comparison between the captured image data acquired at a first timing and the captured image data acquired at a second timing earlier than the first timing, and in a case where a determination that the object is present is made in the object determination step, a frequency of the object obtained by the comparison between the two captured image data is used as the feature in the distance determination step.

(39) The control method according to any one of (32) to (38), in which the optical system includes a focal position adjustment optical system having a variable focal position.

(40) The control method according to (39), further comprising a focus control step of controlling the focal position of the focal position adjustment optical system in a case where a determination that the object is not present is made in the object determination step.

(41) The control method according to (39), further comprising an information generation step of generating information for prompting adjustment of the focal position of the focal position adjustment optical system in a case where a determination that the object is not present is made in the object determination step.

(42) The control method according to (41), in which in the information generation step, the information is displayed on the display portion.

(43) The control method according to any one of (23) to (42), in which the imaging portion images the projection object through a part of the optical system.

(44) A control program of a projection system including an optical system that projects an image generated in a display portion based on input image data to a projection object, and an imaging portion that images the projection object, the control program causing a computer to execute a distance determination step of acquiring first captured image data of the image projected to the projection object from the imaging portion and determining a distance from an object present between the projection object and the optical system to the optical system based on a first sharpness of a part of or the entire first captured image data and a second sharpness of the input image data.

While various embodiments are described above with reference to the drawings, the present invention is not limited to such examples. It is apparent that those skilled in the art may perceive various modification examples or correction examples within a scope disclosed in the claims, and those examples are also understood as falling in a technical scope of the present invention. In addition, any combination of various constituents in the embodiment may be used without departing from a gist of the invention.

The present application is based on Japanese Patent Application (JP2019-138118) filed on Jul. 26, 2019, the content of which is incorporated in the present application by reference.

EXPLANATION OF REFERENCES

1: body part
2: first member
2A, 3A: hollow portion
2a, 2b, 3a, 3c, 15a: opening
3: second member
6: optical unit
11: light source unit
12: light modulation unit
12a: light modulation element
12b: light modulation element driving portion
14: system control portion
14A: distance determination portion
14B: image control portion
14C: object determination portion
14D: focus control portion
15: housing
21: first optical system
22: reflective member
31: second optical system
32: branch member
33: third optical system
34: lens
37: fourth optical system
38: imaging element
39: image processing portion
41: light source
42: color wheel
43: illumination optical system
100: projector
G1: image
g1: input image data
IP: captured image data
IP1: first captured image data
IP2: second captured image data
IP3: third captured image data
K: optical axis
SC: screen
OB: object
ob: object region

What is claimed is:

1. A control device of a projection system including an optical system that projects an image generated in a display portion based on input image data to a projection object, and an imaging portion that images the projection object, the control device comprising:
a controller that acquires first captured image data of the image projected to the projection object from the imaging portion, and determines, based on a first sharpness of a part or an entire part of the first captured image data and a second sharpness of the input image data, that a gesture to the projection object is being performed in a state where a difference or ratio between the first sharpness and the second sharpness is within a predetermined range having an upper limit and a lower limit, and that the gesture is not being performed in a state where the difference or ratio is outside the predetermined range, and changes the input image data in a case where the controller has determined that the gesture is being performed.

2. The control device according to claim 1, wherein the controller sets a sharpness of the entire part of the first captured image data as the first sharpness.

3. The control device according to claim 1, wherein the controller acquires second captured image data of the projection object in a state where the image is not projected to the projection object, from the imaging portion, generates third captured image data that is the part of the first captured image data by subtracting the second captured image data from the first captured image data, and sets a sharpness of the third captured image data as the first sharpness.

4. The control device according to claim 1, further comprising:
an object determination portion that determines presence or absence of the object present between the projection object and the optical system based on captured image data output from the imaging portion,
wherein the controller determines whether the gesture is being performed or not in a case where the object determination portion determines that the object is present.

5. The control device according to claim 4,
wherein the object determination portion acquires captured image data of the projection object in a state where the image is not projected to the projection object, from the imaging portion and sets the acquired captured image data as standard image data, acquires captured image data of the projection object in a state where the standard image data is set and the image is not projected to the projection object, from the imaging portion, and determines the presence or absence of the object based on a comparison between the captured image data and the standard image data.

6. The control device according to claim 4,
wherein the object determination portion acquires captured image data of the projection object in a state where the image is not projected to the projection object, at different timings from the imaging portion, and determines the presence or absence of the object based on a comparison between the captured image data acquired at a first timing and the captured image data acquired at a second timing earlier than the first timing.

7. The control device according to claim 4,
wherein the object determination portion acquires captured image data of the projection object in a state where the image is projected to the projection object, at different timings from the imaging portion, and determines the presence or absence of the object based on a comparison between the captured image data acquired at a first timing and the captured image data acquired at a second timing earlier than the first timing.

8. The control device according to claim 1,
wherein the controller acquires second captured image data of the projection object in a state where the image is not projected to the projection object, from the imaging portion, generates third captured image data that is the part of the first captured image data by subtracting the second captured image data from the first captured image data, and sets a sharpness of the third captured image data as the first sharpness,
the control device further comprises an object determination portion that determines presence or absence of the object present between the projection object and the optical system based on captured image data output from the imaging portion, and
the controller determines whether the gesture is being performed or not in a case where the object determination portion determines that the object is present and a frequency of the object is less than a predetermined value.

9. The control device according to claim 8,
wherein the object determination portion acquires captured image data of the projection object in a state where the image is not projected to the projection object, from the imaging portion and sets the acquired captured image data as standard image data, acquires captured image data of the projection object in a state where the standard image data is set and the image is not projected to the projection object, from the imaging portion, and determines the presence or absence of the object based on a comparison between the captured image data and the standard image data, and in a case where the object determination portion determines that the object is present, the controller obtains a frequency of the object by the comparison between the captured image data and the standard image data.

10. The control device according to claim 8,
wherein the object determination portion acquires captured image data of the projection object in a state where the image is not projected to the projection object, at different timings from the imaging portion and determines the presence or absence of the object based on a comparison between the captured image data acquired at a first timing and the captured image data acquired at a second timing earlier than the first timing, and in a case where the object determination portion determines that the object is present, controller obtains a frequency of the object by the comparison between the two captured image data.

11. The control device according to claim 4,
wherein the optical system includes a focal position adjustment optical system having a variable focal position.

12. The control device according to claim 11, further comprising:
a focus control portion that controls the focal position of the focal position adjustment optical system in a case where the object determination portion determines that the object is not present.

13. The control device according to claim 11, further comprising:
an information generation portion that generates information for prompting adjustment of the focal position of the focal position adjustment optical system in a case where the object determination portion determines that the object is not present.

14. The control device according to claim 13,
wherein the information generation portion displays the information on the display portion.

15. The control device according to claim 1,
wherein the imaging portion images the projection object through a part of the optical system.

16. A projection system comprising:
the control device according to claim 1;
the optical system; and
the imaging portion.

17. A control method of a projection system including an optical system that projects an image generated in a display portion based on input image data to a projection object, and an imaging portion that images the projection object, the control method comprising:
a controlling step of acquiring first captured image data of the image projected to the projection object from the imaging portion, and determining, based on a first sharpness of a part or an entire part of the first captured image data and a second sharpness of the input image data, that a gesture to the projection object is being performed in a state where a difference or ratio between the first sharpness and the second sharpness is within a predetermined range having an upper limit and a lower limit, and that the gesture is not being performed in a state where the difference or ratio is outside the predetermined range, and changing the input image data in a case where the determining has been made that the gesture is being performed.

18. A non-transitory computer readable medium storing a control program of a projection system including an optical system that projects an image generated in a display portion based on input image data to a projection object, and an imaging portion that images the projection object, the control program causing a computer to execute:
a controlling step of acquiring first captured image data of the image projected to the projection object from the imaging portion, and determining, based on a first sharpness of a part or an entire part of the first captured image data and a second sharpness of the input image data, that a gesture to the projection object is being performed in a state where a difference or ratio between the first sharpness and the second sharpness is within a predetermined range having an upper limit and a lower limit, and that the gesture is not being performed in a state where the difference or ratio is outside the predetermined range, and changing the input image data in a case where the determining has been made that the gesture is being performed.

19. The control method according to claim 17,
wherein in the controlling step, a sharpness of the entire part of the first captured image data is set as the first sharpness.

20. The control method according to claim 17,
wherein in the controlling step, second captured image data of the projection object in a state where the image is not projected to the projection object is acquired from the imaging portion, third captured image data that is the part of the first captured image data is generated by subtracting the second captured image data from the first captured image data, and a sharpness of the third captured image data is set as the first sharpness.

21. The control method according to claim 17, further comprising:
an object determination step of determining presence or absence of the object present between the projection object and the optical system based on captured image data output from the imaging portion,
wherein in the controlling step, whether the gesture is being performed or not is determined in a case where a determination that the object is present is made in the object determination step.

22. The control method according to claim 21,
wherein in the object determination step, captured image data of the projection object in a state where the image is not projected to the projection object is acquired from the imaging portion and is set as standard image data, captured image data of the projection object in a state where the standard image data is set and the image is not projected to the projection object is acquired from the imaging portion, and the presence or absence of the object is determined based on a comparison between the captured image data and the standard image data.

23. The control method according to claim 21,
wherein in the object determination step, captured image data of the projection object in a state where the image is not projected to the projection object is acquired at different timings from the imaging portion, and the presence or absence of the object is determined based on a comparison between the captured image data acquired at a first timing and the captured image data acquired at a second timing earlier than the first timing.

24. The control method according to claim 21,
wherein in the object determination step, captured image data of the projection object in a state where the image is projected to the projection object is acquired at different timings from the imaging portion, and the presence or absence of the object is determined based on a comparison between the captured image data acquired at a first timing and the captured image data acquired at a second timing earlier than the first timing.

25. The control method according to claim 17,
wherein in the controlling step, second captured image data of the projection object in a state where the image is not projected to the projection object is acquired from the imaging portion, third captured image data that is the part of the first captured image data is generated by subtracting the second captured image data from the first captured image data, and a sharpness of the third captured image data is set as the first sharpness,
the control method further comprises an object determination step of determining presence or absence of the object present between the projection object and the optical system based on captured image data output from the imaging portion, and
in the controlling step, whether the gesture is being performed or not is determined in a case where a determination that the object is present and a frequency of the object is less than a predetermined value is made in the object determination step.

26. The control method according to claim 25,
wherein in the object determination step, captured image data of the projection object in a state where the image is not projected to the projection object is acquired from the imaging portion and is set as standard image data, captured image data of the projection object in a state where the standard image data is set and the image is not projected to the projection object is acquired from the imaging portion, and the presence or absence of the object is determined based on a comparison between the captured image data and the standard image data, and
in a case where a determination that the object is present is made in the object determination step, a frequency of the object is obtained by the comparison between the captured image data and the standard image data in the controlling step.

27. The control method according to claim 25,
wherein in the object determination step, captured image data of the projection object in a state where the image is not projected to the projection object is acquired at different timings from the imaging portion, and the presence or absence of the object is determined based on a comparison between the captured image data acquired at a first timing and the captured image data acquired at a second timing earlier than the first timing, and
in a case where a determination that the object is present is made in the object determination step, a frequency of the object is obtained by the comparison between the two captured image data in the controlling step.

28. The control method according to claim 21,
wherein the optical system includes a focal position adjustment optical system having a variable focal position.

29. The control method according to claim 28, further comprising:
a focus control step of controlling the focal position of the focal position adjustment optical system in a case where a determination that the object is not present is made in the object determination step.

30. The control method according to claim 28, further comprising:
an information generation step of generating information for prompting adjustment of the focal position of the focal position adjustment optical system in a case where a determination that the object is not present is made in the object determination step.

31. The control method according to claim 30,
wherein in the information generation step, the information is displayed on the display portion.

32. The control method according to claim 17,
wherein the imaging portion images the projection object through a part of the optical system.

* * * * *